United States Patent Office 2,862,902
Patented Dec. 2, 1958

2,862,902

POLYMERIZATION OF 3-VINYLPYRIDINES AND LATEX PRODUCED THEREBY

James E. Pritchard, Bartlesville, Okla., assignor to Phillips Petroleum Company, a corporation of Delaware No Drawing. Application August 10, 1953
Serial No. 373,442

18 Claims. (Cl. 260—29.6)

This invention relates to a process for the production of polymers of 3-vinylpyridine and its alkyl derivatives, the term "polymers," as used herein, being understood to include copolymers as well as homopolymers. In a further aspect this invention relates to a process for polymerizing 3-vinylpyridine and derivatives thereof which comprises effecting this polymerization in an aqueous medium in the presence of an acidic material having an ionization constant of at least $1.0 \times 10^{-10}$. In a further aspect this invention relates to a process which comprises polymerizing, in aqueous solution, a salt of a monomeric 3-vinylpyridine with an acidic material, said acidic material having an ionization constant at least $1.0 \times 10^{-10}$ and less than $1.49 \times 10^{-4}$ and a water solubility of at least 0.2 gram per 100 cc. of water at 20° C.

In U. S. Patent 2,491,472, granted December 20, 1949, to Harmon, a process is disclosed which comprises polymerizing in aqueous solution a salt of a monomeric vinylpyridine with an acid having an ionization constant of at least $1.49 \times 10^{-4}$. The patentee sets forth suitable acids such as glycolic, halogenated acetic, alpha-bromopropionic, and formic, but states that the mineral acids, such as hydrochloric, phosphoric, and sulfuric, are preferred.

While the statements made by the patentee are true as far as certain vinylpyridine compounds are concerned, I have discovered that 3-vinylpyridine and its derivatives thereof, can be polymerized in aqueous solution using acids having ionization constants far below those set forth by Harmon. Using the process of my invention, it is possible to prepare many additional types of polymeric materials and some of these are especially valuable as emulsifying agents for polymerization processes, such as disclosed in my copending applications, Serial No. 255,741, filed October 26, 1951, now Patent 2,746,943, and Serial No. 376,231, filed August 24, 1953. Using this particular vinylpyridine, polymerization occurs at a very rapid rate and high conversion levels are reached. The polymeric salt solution which is obtained can be used as such or it can be treated with an alkaline material to precipitate the free polymeric base which can be washed and dried following precipitation.

Each of the following objects is obtained by at least one of the aspects of this invention.

An object of this invention is to provide a new method of polymerizing vinylpyridines.

A further object of this invention is to provide a method of making polyvinylpyridines which are substantially free from impurities.

A further object of this invention is to provide a method for polymerizing 3-vinylpyridine and derivatives thereof, in an aqueous solution containing an acidic matter having an ionization constant of at least $1.0 \times 10^{-10}$.

Other objects and advantages will be apparent to one skilled in the art.

In accordance with this invention I have found, surprisingly, that polymerization of pyridine derivatives having a vinylidine group in the 3-position are susceptible to polymerization in the presence of acidic materials having comparatively low ionization constants. The polymers produced by this method are clear and colorless and easily distinguished from the types of product obtained using weakly acidic materials when subjecting 2-vinyl- and 4-vinylpyridines to polymerization conditions. When an attempt is made to polymerize the 2-vinyl- and 4-vinylpyridines, orange or yellow colored solutions are obtained and no further polymerization occurs. While I am not certain what exact form of material this represents, I believe that a stable resonating product, perhaps a dimer, is formed which does not undergo further polymerization.

As stated above, I carry out the polymerization in the presence of acidic materials which have an ionization constant from at least $1.0 \times 10^{-10}$ and less than $1.49 \times 10^{-4}$, and which have a water solubility of at least 0.2 gram per 100 cc. of water at 20° C. These materials form water soluble monomeric salts of the 3-vinylpyridines and I believe that it is this salt which undergoes polymerization. As used herein the term "acidic material" follows the Lowry Brønsted theory, these being materials which act as proton donors in an aqueous medium. In some cases it is the hydrate which actually serves as the proton donor.

This group of acidic materials covers a large number of compounds, which for the most part, can be set forth in fairly well defined groups. One group comprises inorganic acids such as arsenious acid, boric acid, chromic acid, hydrazoic acid, hydrocyanic acid, hydrosulfuric acid, and hypochlorous acid. Another group comprises salts of inorganic acids such as ammonium chloride, potassium arsenate, disodium dihydrogen pyrophosphate, sodium dihydrogen phosphate, sodium dihydrogen phosphite, ammonium selenite, and lithium hydrogen sulfate. Organic carboxy acids and their derivatives, such as acetic acid, adipic acid, alanine, benzoic acid, β-bromopropionic acid, n-butyric acid, isobutyric acid, camphoric acid, diethylbarbituric acid, ethylmalonic acid, fumaric acid, gallic acid, glutaric acid, glycine, n-heptoic acid, n-caproic acid, β-chloropropionic, crotonic (trans) acid, crotonic (iso) acid, hexahydrobenzoic acid, m-hydroxybenzoic acid, p-hydroxybenzoic acid, itaconic acid, lactic acid, maleic acid, malic acid, malonic acid, o-methoxybenzoic acid, methylmalonic acid, phenylacetic acid, β-phenylpropionic acid, phthalic acid, pimelic acid, propionic acid, n-propylmalonic acid, pyromucic acid, pyrotartaric acid, succinic acid, tartaric acid, trimethylacetic acid, valeric acid, and isovaleric acid, are preferred.

Another group includes salts of certain organic carboxy acids which have ionization constants within the range above set forth, such as monsodium camphorate, monopotassium citrate, disodium citrate, monolithium glycerophosphate, monosodium malonate, monoammonium oxalate, monosodium succinate, and monosodium tartrate.

Another group of compounds which are suitable in providing the acidic acid medium for polymerization according to my invention include the following: barbituric acid, thioacetic acid, thiophenol, cyanuric acid, and phenol. Based on cost factors, availability, and ease of operation, I prefer to use, as the acidic material, acetic acid, propionic acid, succinic acid, adipic acid, or sodium dihydrogen phosphate.

Pyridine compounds which can be polymerized according to the process of this invention are the 3-vinyl compounds, that is, 3-vinylpyridine itself, and alkyl derivatives thereof. Also applicable are the 3-alpha-methylvinyl (isopropenyl) compounds. These compounds can be represented by the structural formula

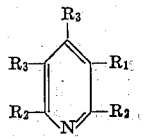

where $R_1$ is selected from the group consisting of

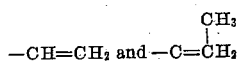

the $R_2$'s are selected from the group consisting of hydrogen, alkyl groups, and other groups which are inert on the ring, such as halogen or alkoxy groups, and $R_3$ is selected from the group consisting of $R_1$ and $R_2$. The various substituted derivatives which are generally preferred are those in which the total number of carbon atoms in $R_2$ and $R_3$ is not greater than 12 and most frequently these groups are methyl and/or ethyl. Representative of the compounds which are applicable are: 2-methyl-5-vinylpyridine (6 - methyl - 3-vinylpyridine), 2-ethyl - 5 - vinylpyridine, 2 - isopropyl - 5 - vinylpyridine, 2 - tert - dodecyl - 5 - vinylpyridine, 2,3 - dimethyl - 5-vinylpyridine, 2 - methyl - 3 - vinylpyridine, 2 - dodecyl-3-vinylpyridine, 4 - tert - butyl - 3 - vinylpyridine, 2,5 - dihexyl - 3 - vinylpyridine, 2,6 - diethyl - 3 - vinylpyridine, 2,4,6 - triethyl - 3 - vinylpyridine, 2 - isopropyl - 5 - nonyl-3 - vinylpyridine, 3,5 - divinylpyridine, 2 - chloro - 5-vinylpyridine, 2,4 - dibromo - 6 - ethyl - 3 - vinylpyridine, 2,6-dipropoxy - 3 - vinylpyridine, 2 - methoxy-5-vinylpyridine, 2 - ethoxy - 3 - fluoro - 4 - propyl - 5 - vinylpyridine, 2-methoxy - 3,5 - divinylpyridine, and the corresponding 3-isopropenylpyridines.

Any vinyl or vinylidene compounds which are copolymerizable with the 3-vinyl-substituted compounds are applicable in this invention. These materials include styrene, alpha-methylstyrene, halogen-, alkyl-, and alkoxy-substituted styrenes, acrylonitrile, methacrylonitrile, methyl acrylate, methyl methacrylate, ethyl acrylate, ethyl methacrylate, methyl vinyl ketone, methyl isopropenyl ketone, methyl vinyl ether, conjugated dienes, and the like. The conjugated dienes are preferably those which contain from four to six, inclusive, carbon atoms per molecule but those containing more carbon atoms per molecule, e. g., eight, can also be used. These compounds include 1,3-butadiene, isoprene, piperylene, methylpentadiene, 2,3-dimethyl-1,3-butadine, chloroprene, and others. Furthermore, various alkoxy such as methoxy and ethoxy, and cyano derivatives of these conjugated dienes can also be employed.

When preparing copolymers, the material copolymerized with the 3-vinyl-substituted pyridine can be employed in an amount up to 90 percent by weight of the total monomeric material.

When operating according to the process of this invention, the 3-vinylpyridine, either alone or with a material copolymerizable therewith, is charged to a reactor together with water, an acidic material having an ionization constant of at least $1.0 \times 10^{-10}$, and appropriate activator and initiator ingredients, and the mixture polymerized. The resulting material is obtained as a clear solution or a stable latex depending upon the type and amount of acid and the monomers employed. It can then be treated, if desired, with an alkaline material such as an alkali metal hydroxide, carbonate or bicarbonate, or a water-soluble amine, to convert the polymeric salt to the free polymeric base. The free polymeric base precipitates and is separated from the serum, washed, and dried.

The amount of acidic material employed is generally that which is sufficient to effect from 25 to 1000, preferably from 40 to 500, percent of that theoretically required for complete neutralization of the basic nitrogen groups in the pyridine compound employed.

Various types of polymerization recipes can be employed such as the persulfate, persulfate-bisulfite, and iron pyrophosphate-hydroperoxide recipes. Polymerization temperatures are generally in the range between —40 and 70° C. When temperatures are below the freezing point of the aqueous medium, a suitable antifreeze agent is included in the system. Polymerization recipes chosen are those which have been found most suitable for the temperature used.

The polymeric salts of this invention can be used as emulsifiers for the production of new polymer compositions such as are described in a copending application, Serial No. 255,741, filed October 26, 1951, and application, Serial No. 376,231, filed August 24, 1953, and for textile treating, Serial No. 274,660, now Patent No. 2,702,763, and Ser. No. 329,450, filed March 3, 1952, and January 2, 1953 respectively. Various types of rubbery and resinous products are obtained when the polymeric salts are converted to the free polymeric bases by treatment with an alkaline material.

The examples which follow demonstrate the applicability of this process to 3-vinylpyridines and show that very little polymerization occurs with other vinyl-substituted pyridines.

Example I

Two runs were set up for the polymerization of 2-vinylpyridine using aqueous systems, one run being made in the presence of acetic acid and the other in the presence of hydrochloric acid. Corresponding runs were set up in which 2-methyl-5-vinylpyridine was used in place of 2-vinylpyridine. The following recipe was employed:

| | Parts by weight |
|---|---|
| Monomer | 100 |
| Water | 300 |
| $K_2S_2O_8$ | 0.9 |
| $NaHSO_3$ | 0.5 |
| Acid | 50 |
| Temperature, °C | 50 |

Results are shown below:

| Monomer | Acid | Conversion, percent, 1.5 hours |
|---|---|---|
| 2-vinylpyridine | Acetic | 10 |
| 2-methyl-5-vinylpyridine | do | 80 |
| 2-vinylpyridine | HCl | 93 |
| 2-methyl-5-vinylpyridine | HCl | 92 |

Example II

The recipe of Example I was used for the copolymerization of acrylonitrile with 2-vinylpyridine and with 2-methyl-5-vinylpyridine using 50/50 monomer ratios. In each case 50 parts by weight of acetic acid was employed. The polymerization temperature was 50° C. The following results were obtained:

| | Conversion, percent, 1.5 hours |
|---|---|
| 50/50 acrylonitrile/2-vinylpyridine copolymer | 0 |
| 50/50 acrylonitrile/2-methyl-5-vinylpyridine copolymer | 92 |

Example III

The recipe of Example I was employed for a series of polymerization runs using four different vinylpyridine compounds. Acetic acid was employed in each case, the amount used being one mol per mol of the vinylpyridine compound. Polymerization was effected at 50° C. The results were as follows:

| Monomer | Acetic acid, parts | Conversion, percent, 1.5 hours |
|---|---|---|
| 2-vinylpyridine | 57 | 11 |
| 4-vinylpyridine | 57 | 10 |
| 2-vinyl-5-ethylpyridine | 50 | (1) |
| 2-methyl-5-vinylpyridine | 50 | 100 |

[1] Phase separation occurred with very little, if any, polymer being formed.

*Example IV*

The recipe of Example I was employed for a series of polymerization runs using the four different vinylpyridine compounds employed in Example III. Two mols of acetic acid per mol of the vinylpyridine compound was used in each case. Polymerization was effected at 50° C. Results of polymerizations after 1.5 hours and 20 hours are shown below:

| Monomer | Acetic acid, parts | Conversion, percent | |
|---|---|---|---|
| | | 1.5 | 20 hours |
| 2-vinylpyridine | 114 | 12 | 12 |
| 4-vinylpyridine | 114 | 11 | 11 |
| 2-vinyl-5-ethylpyridine | 100 | (1) | (1) |
| 2-methyl-5-vinylpyridine | 100 | 98 | 98 |

[1] Phase separation occurred with very little, if any, polymer being formed.

*Example V*

Runs were made for the polymerization of four different vinylpyridine compounds at 50° C. using two mols of acetic acid per mol of the vinylpyridine. Polymerizations were effected in accordance with the following recipe:

Parts by weight
Monomer _____ 100
Water _____ 300
$K_2S_2O_8$ _____ 0.9
Acid _____ Variable Results of polymerization after 1.5 hours and 20 hours are shown below:

| Monomer | Acetic acid, parts | Conversion, percent | |
|---|---|---|---|
| | | 1.5 | 20 hours |
| 2-vinylpyridine | 114 | 6 | 10 |
| 4-vinylpyridine | 114 | 5 | 18 |
| 2-vinyl-5-ethylpyridine | 100 | (1) | 24 |
| 2-methyl-5-vinylpyridine | 100 | 70 | 94 |

[1] Phase separation occurred with very little, if any, polymer being formed.

*Example VI*

Two runs were made for the copolymerization of 2-methyl-5-vinylpyridine at 50° C. in accordance with the following recipes:

| | Parts by weight | |
|---|---|---|
| | I | II |
| 2-methyl-5-vinylpyridine | 50 | 50 |
| Acrylonitrile | 50 | 50 |
| Water | 300 | 300 |
| $K_2S_2O_8$ | 0.9 | 0.9 |
| NaHSO$_3$ | 0.5 | 0.5 |
| Acetic acid | [1] 25 | [2] 50 |
| Time, hours | 1.5 | 1.5 |
| Conversion, percent | 86 | 92 |

[1] One mol per mol 2-methyl-5-vinylpyridine.
[2] Two mols per mol 2-methyl-5-vinylpyridine.

Fluid latices were obtained in both runs.

The latex from run II was employed as the emulsifying agent for the polymerization of acrylonitrile in accordance with the following recipe:

Parts by weight
Acrylonitrile _____ 100
Water _____ 600
Latex from run II (above) _____ 15
$K_2S_2O_8$ _____ 0.9
NaHSO$_3$ _____ 0.5

Temperature, ° C _____ 50
Time, hours _____ 1.5
Conversion, percent _____ 98

A smooth, stable latex was obtained.

*Example VII*

A run was made for the polymerization of 3-vinylpyridine at 50° C. in accordance with the following recipe:

Parts by weight
3-vinylpyridine _____ 100
Water _____ 300
$K_2S_2O_8$ _____ 0.9
NaHSO$_3$ _____ 0.5
Acetic acid _____ 25

A conversion of 76 percent was reached in 1.5 hours. After a total of 20 hours, no additional polymer was formed. At the end of this period 0.9 part by weight of $K_2S_2O_8$ and 0.5 part by weight NaHSO$_3$ were introduced. After another 1.5 hours, the polymerization had reached 90 percent conversion.

*Example VIII*

A run was made for the production of a styrene/2-methyl-5-vinylpyridine copolymer at 50° C. using the following recipe:

Parts by weight
Styrene _____ 50
2-methyl-5-vinylpyridine _____ 50
Water _____ 300
$K_2S_2O_8$ _____ 0.9
NaHSO$_3$ _____ 0.5
Acetic acid _____ 50

After 1.5 hours the conversion had reached 57 percent. Polymerization continued and reached a value of 93 percent after 22 hours, the product being a stable fluid latex.

*Example IX*

Runs were made for the production of methyl methacrylate/2-methyl-5-vinylpyridine copolymers at 50° C. In the following tables are recorded the recipes and conversion for these polymers.

| | Parts by weight | | |
|---|---|---|---|
| Methyl methacrylate | 50 | 80 | 80 |
| 2-methyl-5-vinylpyridine | 50 | 20 | 20 |
| Water | 300 | 300 | 300 |
| $K_2S_2O_8$ | 0.9 | 0.9 | 0.9 |
| NaHSO$_3$ | 0.5 | 0.5 | 0.5 |
| Acetic acid | 50 | 20 | 50 |
| Conversion, percent, 1.5 hours | 82.5 | 37 | 23 |
| Conversion, percent, 18 hours | 97 | | |
| Conversion, percent, 22 hours | | 70 | 99 |

*Example X*

2-methyl-5-vinylpyridine was polymerized in the presence of a considerable variety of acidic materials. In this example, polymerizations were effected in aqueous medium at 50° C. using the recipe of Example I and two equivalents of acid per mol of 2-methyl-5-vinylpyridine.

The different acidic materials used, their amounts, and the conversion reached in 1.5 hours are given in the following table:

| Acidic material | | | Solubility in 100 cc. water at 20 C. | Conversion, percent, 1.5 hrs. |
|---|---|---|---|---|
| Type | Parts/100 parts monomers | Ionization constant | | |
| Propionic acid | 122 | $1.32 \times 10^{-5}$ | ∞ | 98 |
| Beta-bromopropionic acid | 256 | $9.8 \times 10^{-5}$ | Soluble | 78 |
| Lactic acid | 152 | $1.36 \times 10^{-4}$ | ∞ | 100 |
| Barbituric acid (hydrate) | 276 | $1.05 \times 10^{-4}$ | >0.5 | [1] 72 |
| Benzoic acid | 210 | $6.3 \times 10^{-5}$ | 0.3 | [1] 52 |
| Succinic acid | 100 | $6.6 \times 10^{-5}$ | 7 | 100 |
| Phenol | 158 | $1.3 \times 10^{-10}$ | 7 | 65 |
| NaH₂PO₄ | 116 | $7.5 \times 10^{-8}$ | 110 | 100 |
| Cinnamic | 248 | $3.7 \times 10^{-5}$ | 0.1 | 10 |
| Caprylic | 242 | $1.27 \times 10^{-5}$ | <0.2 | 8 |

[1] 600 parts water used in the polymerization recipe.

The reaction mixtures were all clear, colorless solutions. It will be evident that the acids tested in the above table all had an ionization constant of $1.36 \times 10^{-4}$ or less.

In the examples it will be noted that a minor amount, generally approximately 10 percent, of polymeric material is produced with materials which are outside of the scope of this invention; that is, 2-vinyl- and 4-vinylpyridines, and polymerizations conducted in the presence of less soluble acidic materials. Utilizing the acidic materials of the present invention and 2-methyl-5-vinylpyridine, there is a conversion of at least 20 percent in 1.5 hours at 50° C., in a persulfate or bisulfite-persulfate system as the sole catalyst. Of course, the amount of conversion will vary with the monomers employed and the polymerization conditions, but they are all on the same order. When homopolymers of 3-vinylpyridines are prepared the conversion is practically complete in 1.5 hours. As greater amounts of other monomers are added this rate becomes slower. However, the important feature is that the conversion will continue to substantial completion.

Such times are also dependent upon the absence of inhibitors. With some polymerization inhibitors present there may be an induction period before polymerization starts. Following this induction period, substantially complete conversion can be obtained.

As many possible embodiments may be made of this invention without departing from the scope thereof, it is to be understood that all matter herein set forth is to be interpreted as illustrative and not as unduly limiting the invention.

I claim:

1. The process which comprises polymerizing in aqueous solution a salt of a monomeric 3-vinylpyridine with an acidic material, said acidic material having an ionization constant at least $1.0 \times 10^{-10}$ and less than $1.36 \times 10^{-4}$ and a water solubility of at least 0.2 gram per 100 cc. of water at 20° C.

2. The process of claim 1 in which said 3-vinylpyridine comprises at least 10 percent by weight of the total monomeric mixture undergoing polymerization.

3. The process of claim 1 in which said acidic material is acetic acid.

4. The process of claim 1 in which said acidic material is succinic acid.

5. The process of claim 1 in which said acidic material is propionic acid.

6. The process of claim 1 in which said acidic material is sodium dihydrogen phosphate.

7. The process of claim 1 in which said acidic material is adipic acid.

8. A latex produced by the process of claim 1.

9. A latex produced by the process of claim 3.

10. A latex produced by the process of claim 4.

11. A latex produced by the process of claim 5.

12. A latex produced by the process of claim 6.

13. The process which comprises polymerizing in aqueous solution a salt of 2-methyl-5-vinylpyridine and an acidic material, said acidic material having an ionization constant greater than $1.0 \times 10^{-10}$ and less than $1.36 \times 10^{-4}$ and a water solubility of at least 0.2 gram per 100 cc. of water at 20° C.

14. The process which comprises polymerizing in aqueous solution a salt of 2-methyl-5-vinylpyridine and acetic acid.

15. A process for polymerizing a pyridine compound of the structure

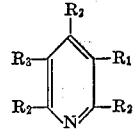

where $R_1$ is selected from the groups consisting of

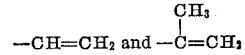

the $R_2$'s are selected from the group consisting of hydrogen, halogen, alkoxy, and alkyl groups, and $R_3$ is selected from the group consisting of $R_1$ and $R_2$, the total number of carbon atoms in said $R_2$ and $R_3$ being not greater than 12, comprising forming an aqueous solution of said compound and an acidic material having an ionization constant greater than $1.0 \times 10^{-10}$ and less than $1.36 \times 10^{-4}$ and a water solubility of at least 0.2 gram per 100 cc. of water at 20° C., and polymerizing the resulting salt.

16. The process of claim 15 in which said pyridine compound comprises at least 10 percent of the total monomer mixture undergoing polymerization.

17. The process of claim 1 in which said acidic material is benzoic acid.

18. The process of claim 1 in which said acidic material is phenol.

References Cited in the file of this patent

UNITED STATES PATENTS 2,491,472    Harmon _____ Jan. 7, 1948

UNITED STATES PATENT OFFICE
Certificate of Correction

December 2, 1958

Patent No. 2,862,902

James E. Pritchard

It is hereby certified that error appears in the printed specification of the above numbered patent requiring correction and that the said Letters Patent should read as corrected below.

Column 3, lines 4 to 9, the formula should appear as shown below instead of as in the patent:

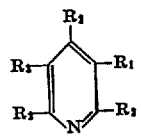

column 6, line 63, in the table, first column thereof, for "$K_2S_3O_8$" read —$K_2S_2O_8$—.

Signed and sealed this 14th day of April 1959.

[SEAL]

Attest:
KARL H. AXLINE,
*Attesting Officer.*

ROBERT C. WATSON,
*Commissioner of Patents.*